US009894244B2

United States Patent
(12) United States Patent
Nakano

(10) Patent No.: US 9,894,244 B2
(45) Date of Patent: Feb. 13, 2018

(54) IMAGE PROCESSING SYSTEM AND IMAGE PROCESSING METHOD THAT PERFORM CORRECTION OF SHIFTING BITMAP DATA IN A SUB-SCANNING DIRECTION TO CANCEL BENDING OF AND ELECTRO-PHOTOGRAPHIC LASER SCANNING LINE

(71) Applicant: CANON KABUSHIKI KAISHA, Tokyo (JP)

(72) Inventor: Toshimitsu Nakano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/275,724

(22) Filed: Sep. 26, 2016

(65) Prior Publication Data

US 2017/0094115 A1 Mar. 30, 2017

(30) Foreign Application Priority Data

Sep. 30, 2015 (JP) ................................. 2015-193352
Sep. 9, 2016 (JP) ................................. 2016-176864

(51) Int. Cl.

*H04N 1/40* (2006.01)
*H04N 1/04* (2006.01)
*H04N 1/028* (2006.01)
*G06K 15/12* (2006.01)

(Continued)

(52) U.S. Cl.

CPC ......... *H04N 1/40068* (2013.01); *G03G 15/50* (2013.01); *G06K 15/1223* (2013.01); *G06K 15/1809* (2013.01); *G06K 15/1843* (2013.01); *H04N 1/0282* (2013.01); *H04N 1/0414* (2013.01); *H04N 2201/0094* (2013.01)

(58) Field of Classification Search

None

See application file for complete search history.

(56) References Cited

U.S. PATENT DOCUMENTS 8,384,956 B2 2/2013 Nakano
2004/0246330 A1* 12/2004 Hayashi ............ G06K 15/1223 347/243
2012/0274989 A1* 11/2012 Haruta .................. H04N 1/506 358/448

FOREIGN PATENT DOCUMENTS

JP H04-336859 A 11/1992

* cited by examiner

*Primary Examiner* — Andrew H Lam

(74) *Attorney, Agent, or Firm* — Fitzpatrick, Cella, Harper & Scinto

(57) ABSTRACT

An image processing system performs correction of shifting bitmap data in a sub-scanning direction so as to cancel bending of an electro-photographic laser scanning line. A line command conversion unit converts a first line drawing command defining a line width as an even-number pixel width less than a predetermined even-number pixel width into a second line drawing command defining a line width as the predetermined even-number pixel width, and converts a third line drawing command defining a line width as an odd-number pixel width less than the predetermined even-number pixel width into the second line drawing command. A generation unit generates binary bitmap data with first resolution on a basis of drawing data including the second line drawing command. A correction unit performs the correction with respect to the generated binary bitmap data. A resolution conversion unit converts the binary bitmap data.

14 Claims, 13 Drawing Sheets

(51) Int. Cl.

| | |
|---|---|
| ***G06K 15/02*** | (2006.01) |
| ***G03G 15/00*** | (2006.01) |

0 1 2 3 4 5 6 7 8 9 10 11
0
1
2
3
4
5
6
7
8
9
10
11
12
13
14
501
502

1 2 1
2 4 2
1 2 1

511
0 1 2 3 4 5 6 7 8 9 10 11
0%
25%
75%
100%
75%
25%
0%
0%
25%
75%
100%
75%
25%
0%
0%
502

0 2 4 6 8 10
0
75%
75%
0%
25%
100%
25%
0%
521
522

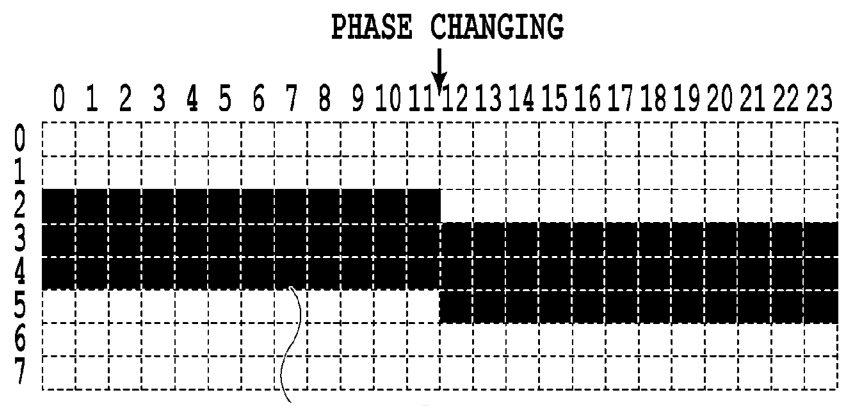
FIG.7A
FIG.7B
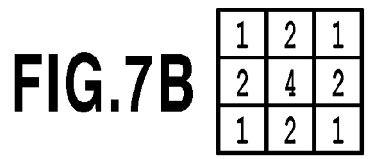
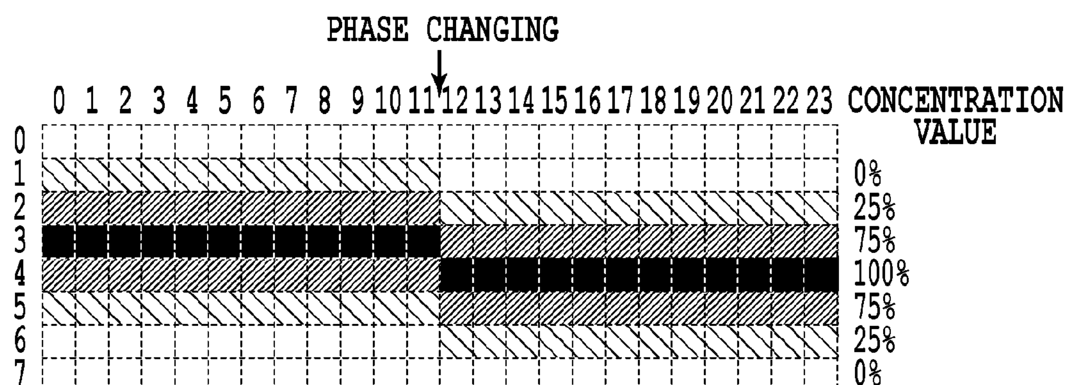
FIG.7C
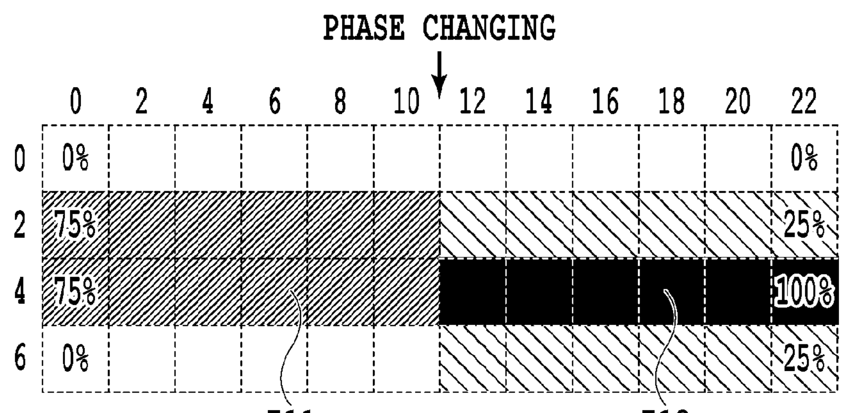
FIG.7D

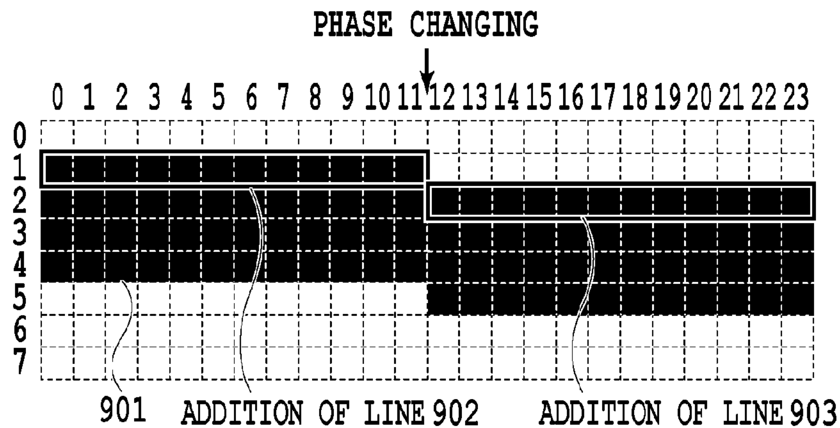
FIG.9A
FIG.9B
| 1 | 2 | 1 |
|---|---|---|
| 2 | 4 | 2 |
| 1 | 2 | 1 |
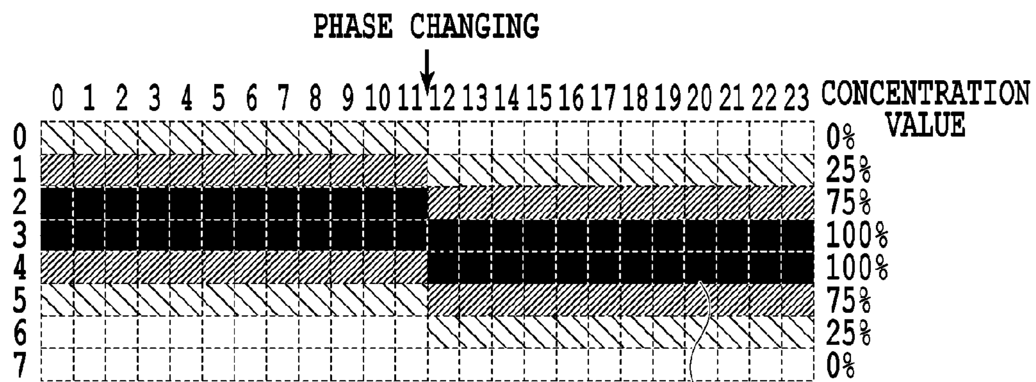
FIG.9C
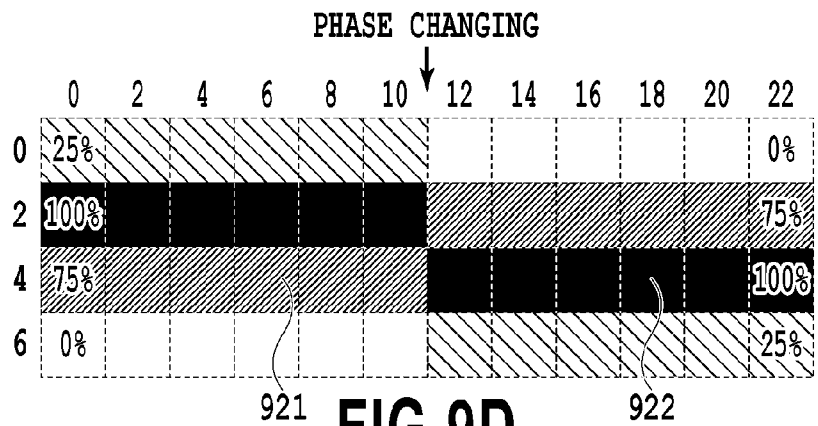
FIG.9D

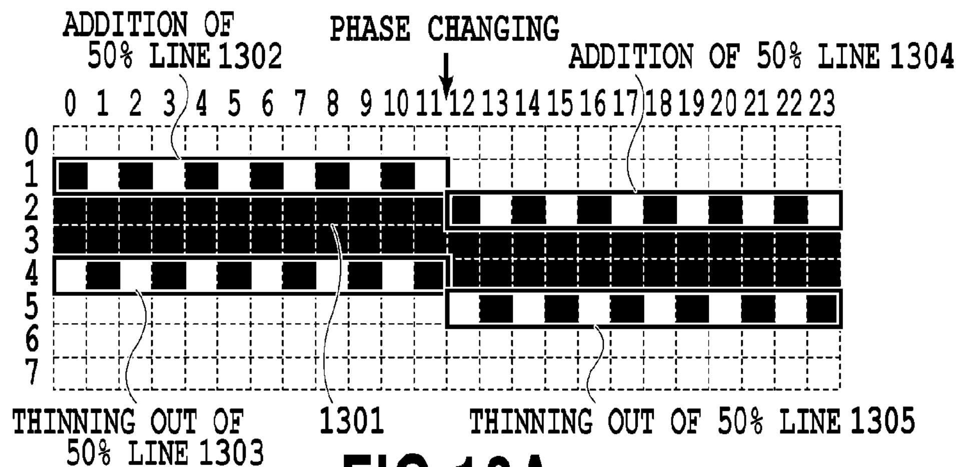
FIG.13A
FIG.13B
| 1 | 2 | 1 |
|---|---|---|
| 2 | 4 | 2 |
| 1 | 2 | 1 |
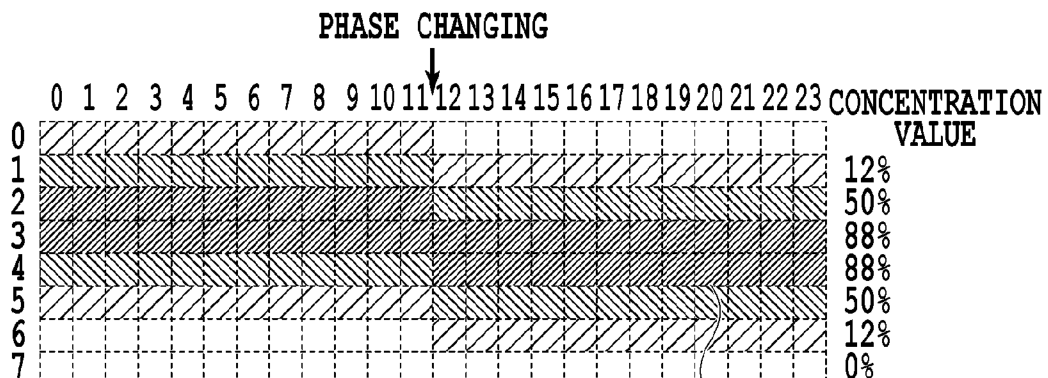
FIG.13C
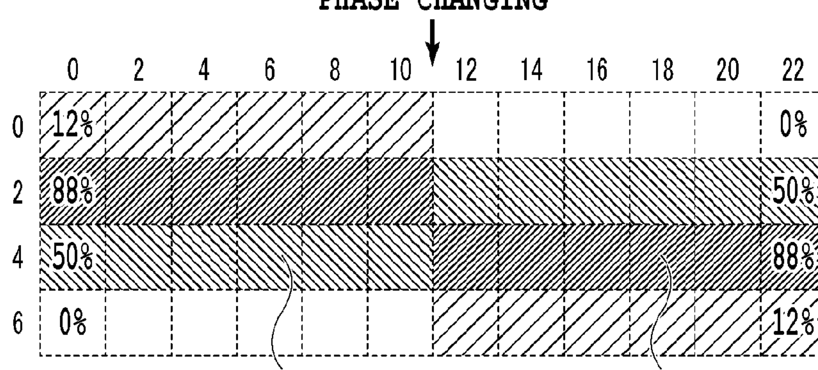
FIG.13D

IMAGE PROCESSING SYSTEM AND IMAGE PROCESSING METHOD THAT PERFORM CORRECTION OF SHIFTING BITMAP DATA IN A SUB-SCANNING DIRECTION TO CANCEL BENDING OF AND ELECTRO-PHOTOGRAPHIC LASER SCANNING LINE

CLAIM OF PRIORITY

This application claims the benefit of Japanese Patent Application No. 2015-193352, filed Sep. 30, 2015, and No. 2016-176864, filed Sep. 9, 2016, which are hereby incorporated by reference herein in their entirety.

FIELD OF THE INVENTION

The present invention relates to fine line correction technology for optically drawing fine lines in an equal thickness.

DESCRIPTION OF THE RELATED ART

In the related art, a printing apparatus performs printing by developing printing data, which is transmitted from a host computer, into bitmap data, and performing predetermined image processing with respect to the bitmap data that is developed. Typically, the bitmap data is developed as data with the same resolution as that of the printing apparatus.

In addition, there is also suggested a technology of performing printing after development into bitmap data with a resolution higher than the resolution of the printing apparatus, and resolution conversion into the resolution of the printing apparatus by using a spot-multiplexing technology for respective pixels. When using the spot-multiplexing technology, it is possible to express image quality with a resolution higher than the resolution of the printing apparatus.

The spot-multiplexing technology is a technology of forming dots with a resolution higher than a resolution of a printer in an electro-photographic printer. Specifically, in the spot-multiplexing technology, with respect to pixels adjacent to each other, dots capable of overlapping each other are formed through optical drawing in an intermediate electrical potential level. When the dots capable of overlapping each other are formed through optical drawing in the intermediate electrical potential level, an electrical potential level of overlapping portions becomes a high level. As a result, even at a position between pixels adjacent to each other, in which a dot is not capable of being formed with a resolution of the printer, the dot is also formed. Accordingly, a dot with a resolution higher than the resolution of the printer is formed. Japanese Patent Laid-Open No. H04-336859(1992) discloses the spot-multiplexing technology.

SUMMARY OF THE INVENTION

As described above, in the spot-multiplexing technology, when generating a dot with a resolution of a printer, a dot in an intermediate electrical potential level is generated so as to form a dot with a high resolution. On the other hand, when optically drawing a line, laser bending correction, in which a phase is changed to a sub-scanning direction, is performed, so as to correct bending of a laser scanning line. In the case of using a dot in an intermediate electrical potential level so as to perform the spot-multiplexing, even in lines having the same width, electrical potential levels, which are generated, are different from each other in accordance with a phase (a position in the sub-scanning direction). Therefore, the thickness of the lines may vary. Particularly, in the case of a thin line, there is a problem that a difference in the thickness is significant.

According to one aspect, the invention provides an image processing system that performs correction of shifting bitmap data in a sub-scanning direction so as to cancel bending of an electro-photographic laser scanning line. The image processing system includes a line command conversion unit that converts a first line drawing command defining a line width as an even-number pixel width less than a predetermined even-number pixel width into a second line drawing command defining a line width as the predetermined even-number pixel width, a generation unit that generates binary bitmap data with a first resolution on a basis of drawing data including the second drawing command, a correction unit that performs the correction with respect to the binary bitmap data that is generated, a resolution conversion unit that converts the binary bitmap data, which is corrected, into multi-value bitmap data with a second resolution, lower than the first resolution, and an output unit that outputs the multi-value bitmap data, which is converted, to a printing unit.

Further features of the present invention will become apparent from the following description of exemplary embodiments (with reference to the attached drawings).

BRIEF DESCRIPTION OF THE DRAWINGS

FIG. 7A is a view illustrating a multi-value bitmap during phase changing according to the first embodiment;

FIG. 7B is a view illustrating a filter that is used during phase changing according to the first embodiment;

FIG. 7C is a view illustrating a multi-value bitmap during phase changing according to the first embodiment;

FIG. 7D is a view illustrating a multi-value bitmap during phase changing according to the first embodiment;

FIG. 9A is a view illustrating a multi-value bitmap during the line-width adjustment according to the first embodiment;

FIG. 9B is a view illustrating a filter that is used during the line-width adjustment according to the first embodiment;

FIG. 9C is a view illustrating a multi-value bitmap during the line-width adjustment according to the first embodiment;

FIG. 9D is a view illustrating a multi-value bitmap during the line-width adjustment according to the first embodiment;

FIG. 13A is a view illustrating a multi-value bitmap during 50% line-width adjustment according to the third embodiment;

FIG. 13B is a view illustrating a filter that is used during the 50% line-width adjustment according to the third embodiment;

FIG. 13C is a view illustrating a multi-value bitmap during 50% line-width adjustment according to the third embodiment; and FIG. 13D is a view illustrating a multi-value bitmap during 50% line-width adjustment according to the third embodiment.

DESCRIPTION OF THE EMBODIMENTS

Hereafter, embodiments of the invention will be described with reference to the accompanying drawings. In the following embodiments, a description will be given of an example in which a multi-function peripheral (MFP) provided with a plurality of functions, such as a copying function and a printer function, is used as an image processing apparatus. On the other hand, the image processing apparatus in the following embodiments may be an apparatus that is used in electro-photographic printing, and is not limited to the MFP.

First Embodiment

In a first embodiment, a description will be given of an image processing system using the MFP (image processing apparatus) that performs spot-multiplexing processing of forming a dot with a resolution higher than a resolution of a printer, as an example. In addition, a description will be given of an example in which a line is corrected in advance, in order for the thickness of the line not to vary in accordance with a phase during optical drawing (that is, in accordance with an optical drawing position in a sub-scanning direction in consideration of laser bending correction) in a case when the MFP acquires drawing data including a line drawing command.

[Image Processing System]

Figure 1:
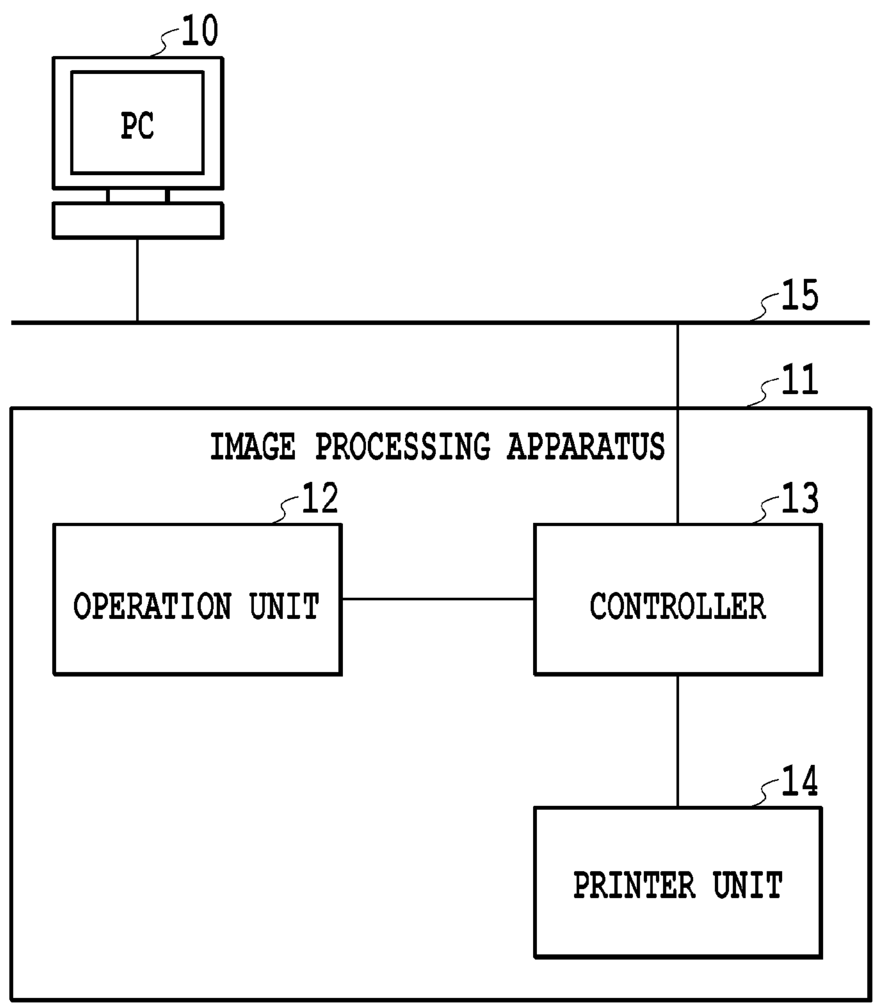
FIG. 1 is a block diagram illustrating a configuration of an image processing system according to a first embodiment.

FIG. 1 is a block diagram illustrating a configuration of an image processing system according to this embodiment. In the image processing system illustrated in FIG. 1, an information processing apparatus (host computer) 10 and an image processing apparatus 11 are connected to a network 15. On the other hand, the number of connections is not limited to the example shown in FIG. 1. In addition, in this example, a network is used as a connection method, but there is no limitation thereto. For example, a serial transmission type, such as a USB, a parallel transmission type, such as Centronics, and an SCSI, and the like, are applicable to the connection method.

The host computer (hereafter, referred to as "PC") 10 has a function of a personal computer. The PC 10 transmits drawing data to the image processing apparatus 11 through a printer driver.

The image processing apparatus 11 includes a printer unit 14 that is an image output device, a controller 13 that is in charge of an operation control of the entirety of the image processing apparatus 11, and an operation unit 12 including a plurality of keys used by a user to give an instruction, and a display unit that displays various kinds of information to be notified to the user.

[Controller]

Figure 2:
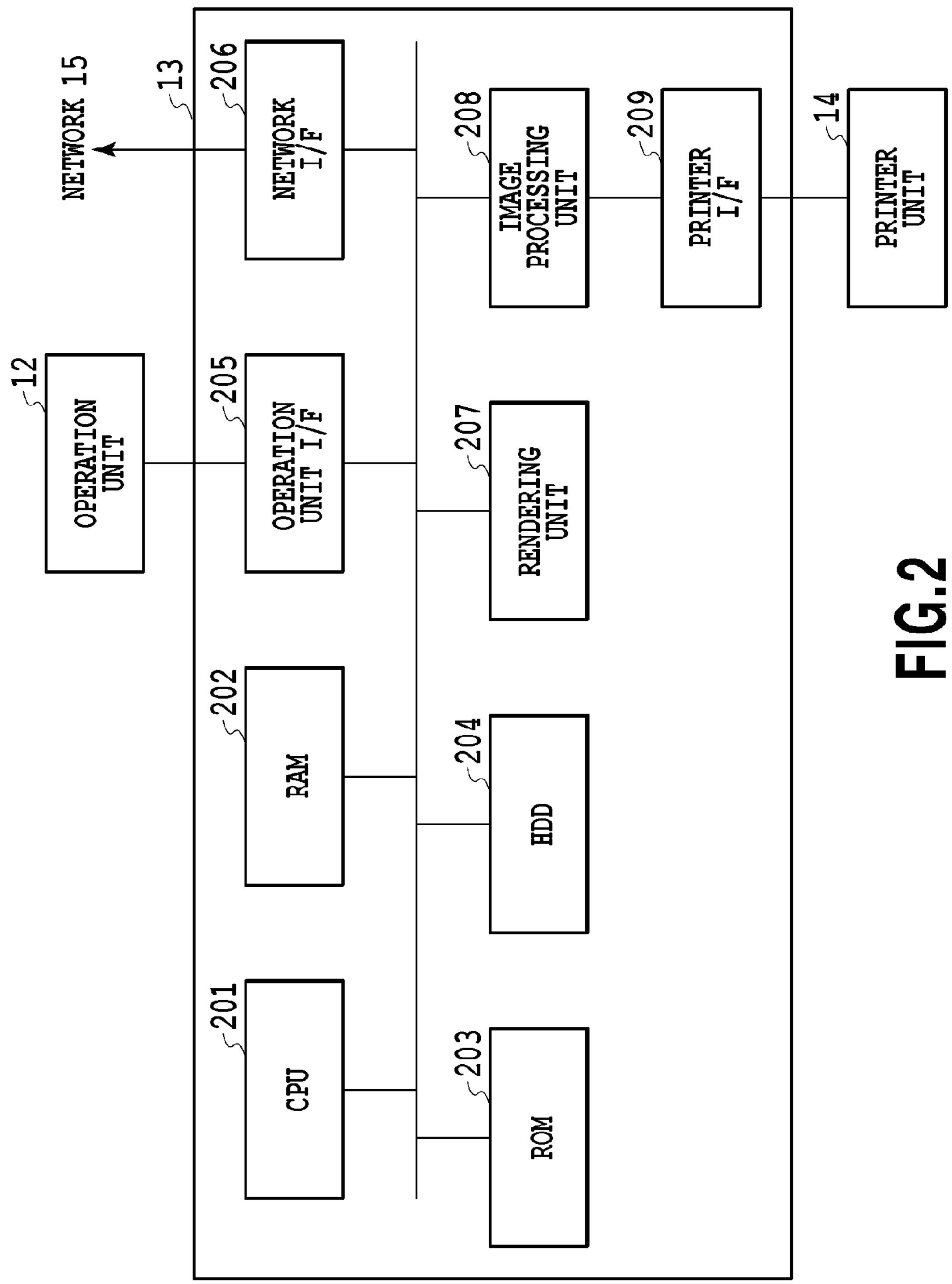
FIG. 2 is a block diagram illustrating a configuration of a controller of the image processing apparatus according to the first embodiment.

FIG. 2 is a block diagram of the image processing apparatus 11, and illustrates a detailed configuration of the controller 13. The controller 13 is connected to the PC 10, an external image processing apparatus, and the like, through the network 15. According to this, input and output of drawing data and device information are possible. The controller 13 includes a CPU 201, a RAM 202, a ROM 203, an HDD 204, an operation unit I/F 205, a network I/F 206, a rendering unit 207, an image processing unit 208, and a printer I/F 209.

The CPU 201 performs an overall control of access with various kinds of devices in connection, on the basis of a control program stored in the ROM 203, and performs an overall control of various kinds of processing, such as image processing, that is performed on an inner side of the controller. The RAM 202 is a system work memory for an operation of the CPU 201, and is also a memory that temporarily stores drawing data and image data, such as a bitmap. The RAM 202 includes an SRAM that retains stored contents even after power-off, and a DRAM, in which stored contents are erased after power-off. A device booting program, and the like, are stored in the ROM 203. The HDD 204 is a hard disk driver, and can store system software and image data.

The operation unit I/F 205 is an interface unit for connection with the operation unit 12. The operation unit I/F 205 outputs image data to be displayed on the operation unit 12 to the operation unit 12, and acquires information that is input from the operation unit 12. The network I/F 206 is connected to the network 15, and transmits and receives drawing data, image data, and information.

The rendering unit 207 receives drawing data (PDL data) that is transmitted from the PC 10, and the like. The rendering unit 207 generates intermediate data on the basis of the PDL data described with a PDL code that is received, and generates contone (multi-value) image bitmap data on the basis of the intermediate data that is generated.

The image processing unit 208 receives the image bitmap data that is generated in the rendering unit 207, and performs image processing with respect to the image bitmap data with reference to attribute data that is attached to the image bitmap data. The bitmap data after being subjected to the image processing is output to the printer unit 14 through the printer I/F 209.

[Rendering Processing]

Figure 3:
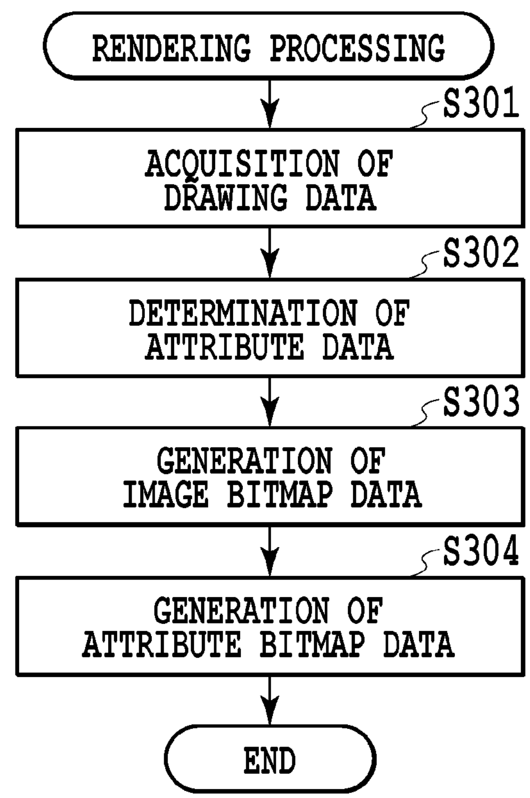
FIG. 3 is a flowchart illustrating a flow of rendering processing according to the first embodiment.

FIG. 3 is a flowchart illustrating a flow of rendering processing in the rendering unit 207. In FIG. 3, in step S301, the rendering unit 207 acquires PDL data (drawing data) that is transmitted from the PC 10, and the like. A drawing command for drawing of respective objects, information indicating drawing resolution, and the like, are included in PDL data. In step S302, the rendering unit 207 analyzes the drawing data that is acquired in step S301, and determines whether or not the drawing command included in the drawing data is a drawing command of which have an attribute among a character, a line, a figure, and an image. In a case when the drawing command included in the drawing data is a character drawing command that is expressed by a character type, a character code, and the like, the rendering unit 207 determines the attribute as a character attribute. In a case when the drawing command is a line drawing command that is expressed by a coordinate point, a length, and thickness, the rendering unit 207 determines the attribute as a line attribute. In a case when the drawing command is a figure drawing command that is expressed by a rectangle, a shape, and a coordinate point, the rendering unit 207 determines the attribute as a figure attribute. In a case when the drawing command is an image drawing command that is expressed by bitmap data, the rendering unit 207 determines the attribute as an image attribute. The rendering unit 207 generates intermediate data corresponding to the attribute that is determined.

Next, in step S303, the rendering unit 207 forms a pixel pattern that is drawn in conformity to processing resolution of the controller on the basis of the intermediate data that is generated, and generates image bitmap data in which color information (contone value) to be drawn to each pixel is included in the pixel. In this embodiment, image bitmap data with first processing resolution, which is processing resolution of the controller, is generated. That is, in this embodiment, image bitmap data with a first processing resolution instead of a second processing resolution is generated. The first processing resolution is processing resolution of a controller that is higher than the second processing resolution that is processing resolution of the printer unit 14. On the other hand, as described above, the resolution is based on information, which indicates resolution, included in the PDL data. In addition, in step S304, the rendering unit 207 generates attribute bitmap data, which stores the attribute analyzed in step S302, so as to correspond to each pixel of the image bitmap data, and terminates the processing. The attribute bitmap data is image data having the same processing resolution and size as in the image bitmap data. In addition, the attribute bitmap data is data in which each pixel has a value indicating an attribute of the pixel in the image bitmap data.

The drawing bitmap data and the attribute bitmap data, which are generated, are recorded on the RAM 202 or the HDD 204, and are transmitted to the image processing unit 208.

[Image Processing Unit]

Figure 4:
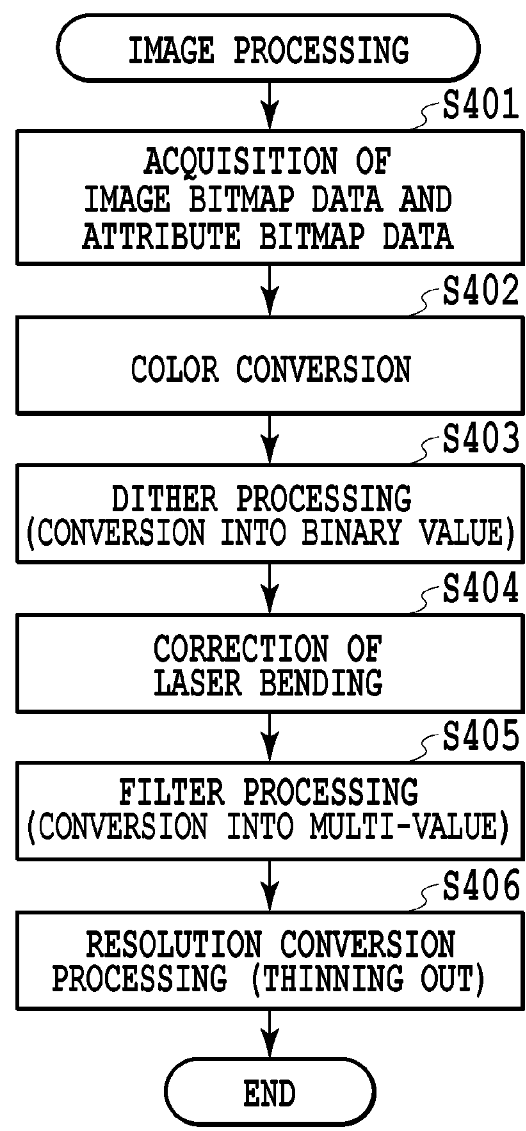
FIG. 4 is a flowchart illustrating a flow of image processing according to the first embodiment.

FIG. 4 is a flowchart illustrating a flow of processing by the image processing unit 208. In step S401, the image processing unit 208 acquires the image bitmap data with the processing resolution of the controller and the attribute bitmap data, which are generated in the rendering unit 207. Next, in step S402, the image processing unit 208 converts color information of each pixel in the image bitmap data into CMYK, which are color types of a printer engine or a K color type by using a color conversion look-up table (LUT) or a matrix operation.

Next, in step S403, the image processing unit 208 selects a dither matrix in accordance with attribute information of each pixel in the attribute bitmap data, and performs dither processing by using the dither matrix that is selected for a pixel of the image bitmap data. For example, with respect to a pixel of which an attribute indicates a character, the image processing unit 208 performs the dither processing by selecting a dither matrix corresponding to the character. According to this, image processing, such as emphasis and planarization of an edge, is performed in accordance with the attribute. The image processing unit 208 converts each pixel value in the image bitmap, which is a contone value, into a binary value by performing the dither processing, and generates binary bitmap data.

In addition, in step S404, so as to correct bending of laser scanning lines, the image processing unit 208 performs laser bending correction of changing a phase in a sub-scanning direction (shifting an optical drawing position in the sub-scanning direction) with respect to the binary bitmap data that is generated.

In addition, in step S405, the image processing unit 208 performs multi-value processing of converting the binary bitmap data into multi-value bitmap data by using a multi-value filter for the spot-multiplexing processing. Before the processing in step S405, the resolution of the bitmap data is set to the processing resolution of the controller as described above.

Next, in step S406, the image processing unit 208 performs resolution conversion processing by thinning out a pixel of the bitmap data. That is, the image processing unit 208 performs resolution conversion processing of converting bitmap data with the resolution (first resolution) of the controller into bitmap data with resolution (second resolution) of a printer, and generates multi-value bitmap data with the resolution of the printer.

Next, a description will be given of the multi-value processing in step S405 and the resolution conversion processing in step S406.

[Processing of Generating Multi-Value Bitmap with Resolution of Printer]

FIGS. 5A to 5D are views illustrating processing of generating multi-value bitmap data with a resolution of the printer from binary bitmap data with a resolution of the controller. The multi-value bitmap data with the printer resolution is generated by converting the binary bitmap data with the processing resolution of the controller into a multi-value through multi-value processing, and by performing thinning-out through resolution conversion processing. This embodiment illustrates processing of converting binary bitmap data of 1200 dpi that is the processing resolution of the controller into multi-value bitmap data of 600 dpi that is the printing resolution of a printer.

Figures 5A, 5B, 5C, 5D:
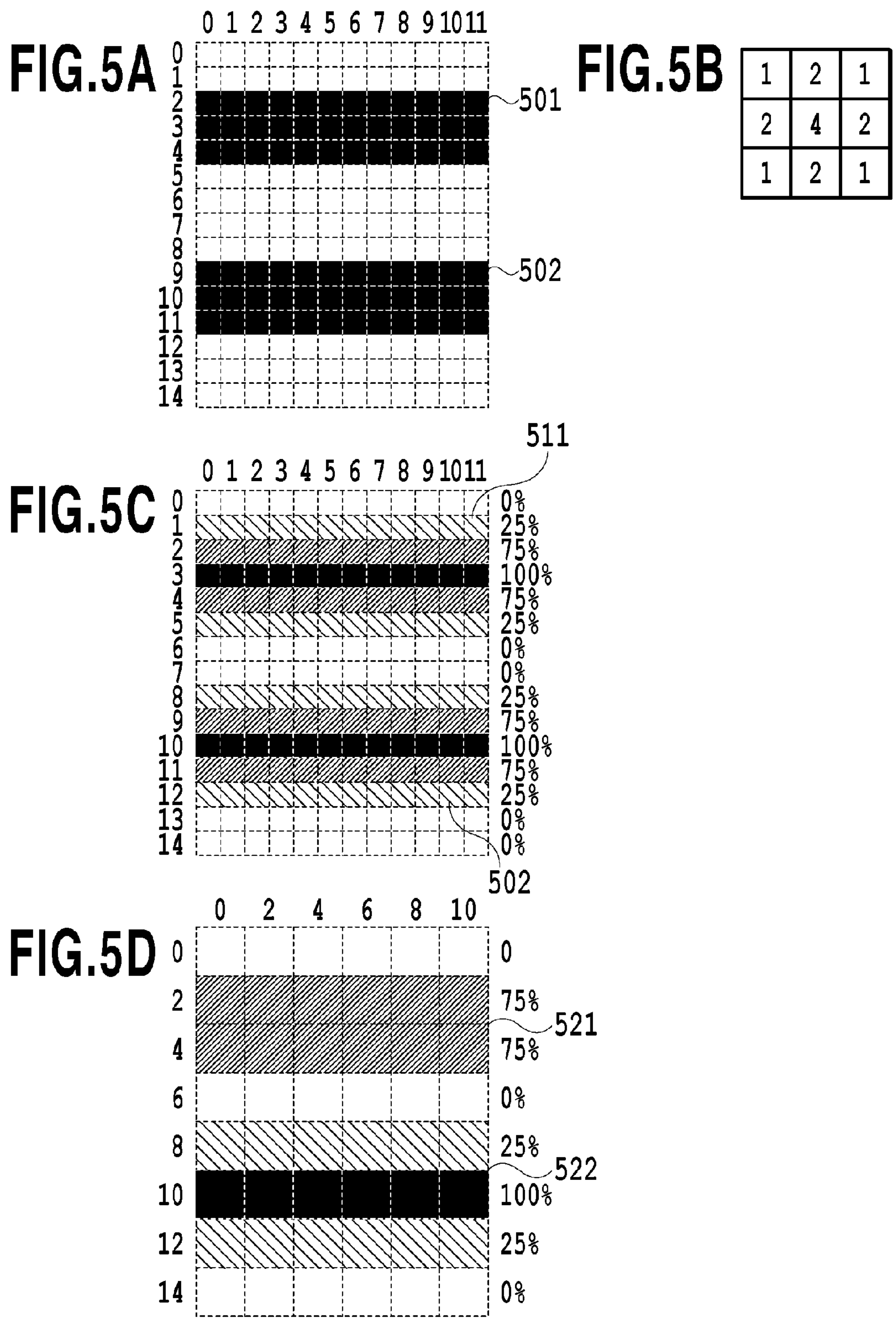
FIG. 5A is an explanatory view of generation of a multi-value bitmap with a printer resolution according to the first embodiment.
FIG. 5B is an explanatory view of generation of the multi-value bitmap with a printer resolution according to the first embodiment.
FIG. 5C is an explanatory view of generation of the multi-value bitmap with a printer resolution according to the first embodiment.
FIG. 5D is an explanatory view of generation of the multi-value bitmap with a printer resolution according to the first embodiment.

FIG. 5A illustrates a binary (white: 0, black: 1) bitmap with a resolution of 1200 dpi, in which one compartment is set as one pixel, and the bitmap indicates two lines (a line 501 and a line 502), each having a three-pixel width. On the other hand, in the following description, a “pixel width” represents a pixel width in accordance with the resolution (here, 1200 dpi) of the controller.

FIG. 5B illustrates a filter having a weighting coefficient in a size of 3×3 for conversion into a multi-value. The central position of the filter corresponds to a target pixel of the bitmap, and the filter has a weighting coefficient at each position with respect to the target pixel and peripheral pixels. The filter illustrated in FIG. 5B is a filter capable of setting a pixel value of the target pixel to an intermediate-level concentration with reference to pixel values of the peripheral pixels. In the multi-value processing, conversion into a multi-value is performed by setting the sum of a value, which is obtained by multiplying each pixel value (0 or 1) of the target pixel and the peripheral pixels by the weighting coefficient of the filter, to a value of the target pixel. In the multi-value processing, conversion into a multi-value is performed with respect to binary bitmap data with the processing resolution of the controller by performing repetitive processing in a state in which all pixels included in the bitmap are set as the target pixel.

For example, in the case of 3 (horizontal) and 2 (vertical), a coordinate position is expressed by coordinates (3, 2). When a pixel of the coordinates (3, 2) in FIG. 5A is set as the target pixel, pixels having coordinates (2, 1), (3, 1), (4, 1), (2, 2), (4, 2), (2, 3), (3, 3), and (4, 3) become the peripheral pixels. A pixel value of the coordinates (3, 2) in FIG. 5A in conversion into a multi-value is calculated as follows. That is, in a case when a pixel is white (0), 0 is added, and in a case when the pixel is black (1), a 1×weighting coefficient is added. As a result, the sum becomes peripheral pixels (0+0+0+1×2+1×2+1×1+1×2+1×1) target pixel (1×4)=12. Accordingly, a pixel value (multi-value) after the filter processing of the coordinates (3, 2) becomes 12.

FIG. 5C illustrates a bitmap as a result of multi-value processing with respect to the entirety of the pixels in FIG. 5A. A concentration value of a pixel is expressed as the proportion to the sum (16) of the weighting coefficient of the filter. For example, a pixel value of the coordinates (3, 2) is 12, and thus, the concentration value becomes 12/16, that is, 75%.

When applying the filter in FIG. 5B, a line bitmap having a three-pixel width is converted into a line including pixels with concentration values of 0%, 25%, 75%, and 100% through the multi-value processing (a line 511 and a line 512).

FIG. 5D illustrates a 600 dpi multi-value bitmap that is obtained through resolution conversion of a 1200 dpi bitmap illustrated in FIG. 5C. In the resolution conversion processing, with respect to the bitmap, which is converted into a multi-value, in FIG. 5C, pixels are subjected to sampling for each pixel (vertical and horizontal) for conversion from 1200 dpi that is a resolution of the controller into 600 dpi that is the half of the printing resolution of the printer. That is, a sampling period of the pixels is a two-pixel period for each of a vertical direction and a horizontal direction. On the other hand, as will be described later with reference to FIGS. 7A to 7D, in a case when the sampling period is out of synchronization with (not equal to) a deviation width (a line shift width) of a line in the horizontal and vertical directions, a combination of relative positions in sampling with respect to a line is apt to vary with a position, at which the deviation (shift) occurs, as a boundary. In addition to this, with regard to the thickness (width) of a line, relative sampling positions with respect to the line is neither equal nor inverted between a forward side and a backward side of the boundary. When applying a spot-multiplexing technology to be described later, a difference occurs in the thickness of the lines formed on the forward side and the backward side of the boundary.

For example, pixels 0, 2, 4, 6, 8, and 10 in vertical coordinates are sampled with a one-pixel interval, and pixels 0, 2, 4, 6, 8, 10, 12, and 14 in horizontal coordinates are sampled with a one-pixel interval for conversion into a multi-value bitmap with a resolution of 600 dpi. In the multi-value bitmap with a resolution of 600 dpi, a line 501 having a three-pixel width in FIG. 5A becomes a line 521 that is constituted by two dots having concentration values 75% and 75%. A line 502 having a three-pixel width in FIG. 5A becomes a line 521 that is constituted by three dots having concentration values of 25%, 100%, and 25%.

The multi-value bitmap data, of which a resolution is converted into the resolution of the printer in the resolution conversion processing, with a resolution of 600 dpi is output to the printer unit 14 through the printer I/F 209. A description above has been given of the filter processing in step S405, and the resolution conversion processing in step S406 in FIG. 4.

[Spot-Multiplexing Technology]

Figure 6:
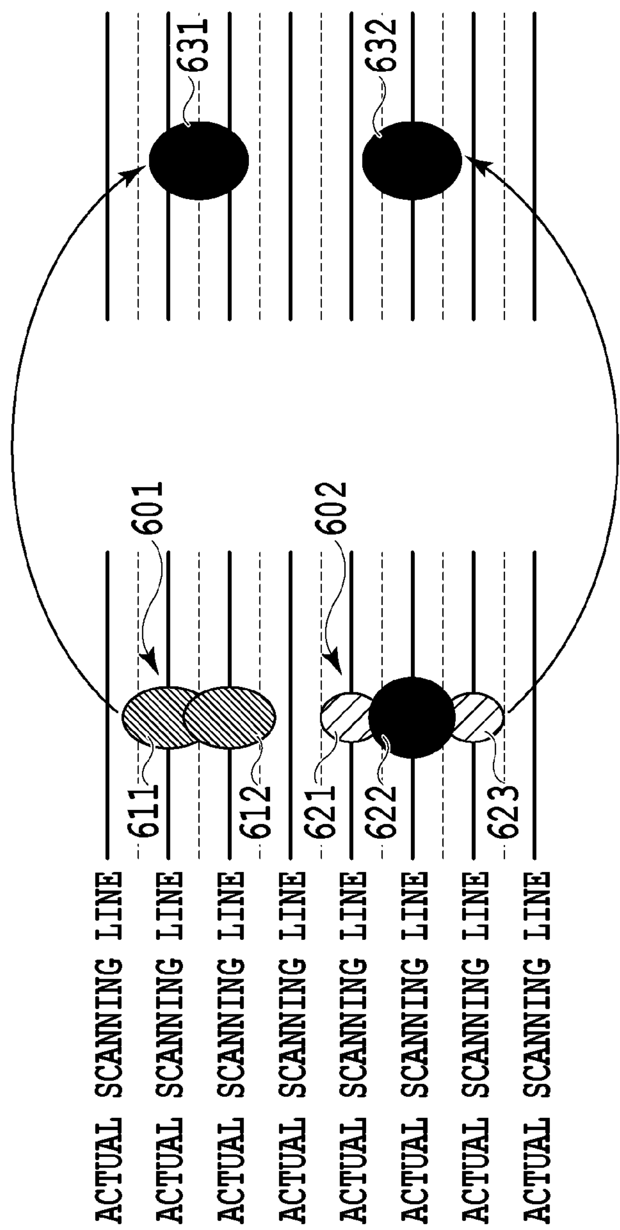
FIG. 6 is an explanatory view of a spot-multiplexing technology according to the first embodiment.

FIG. 6 illustrates a formation principle of a sub-dot between dots through overlapping of laser exposure by the spot-multiplexing technology. In the spot-multiplexing technology, a spot diameter due to laser exposure corresponding to one pixel is greater than the one pixel, and thus, parts of spots of adjacent pixels overlap each other. The spot-multiplexing technology positively utilizes the overlapping of the parts. Dots in an intermediate electrical potential level are given to upper and lower pixels 611 and 612 on actual scanning lines indicated by a solid line, and a dot 631 is formed at an intermediate position between the actual scanning lines through exposure overlapping. According to this, a resolution higher in comparison to the scanning lines is expressed. That is, when using the example with the resolution described in FIGS. 5A to 5D, it is possible to realize expression of a resolution corresponding to three pixels in 1200 dpi that is the resolution of the controller, rather than an expression resolution corresponding to two pixels in 600 dpi (resolution corresponding to four pixels in 1200 dpi that is the resolution of the controller).

The line 501 having a three-pixel width, in which a position (vertical phase) in a sub-scanning direction in FIG. 5A starts from an even coordinate, is expressed as a line 521 that is constituted by two dots having concentration values of 75% and 75% in FIG. 5D. The line 521 is exposed at a dot 611 in a 75% electrical potential level and a dot 612 in a 75% electrical potential level on the real scanning lines in FIG. 6. As a result, the line 521 is drawn as a line 631 corresponding to a three-pixel width at coordinates intermediate of the real scanning lines.

In addition, the line 502 having a three-pixel width, in which a position (vertical phase) in the sub-scanning direction in FIG. 5A starts from an odd coordinate, is expressed as a line 522 that is constituted by three dots having concentration values of 25%, 100%, and 25% in FIG. 5D. The line 522 is exposed at a dot 621 in a 25% electrical potential level, a dot 622 in a 100% electrical potential level, and a dot 623 in a 25% electrical potential level on actual scanning lines in FIG. 6. As a result, the line 522 is drawn as a line 632 corresponding to a three-pixel width at coordinates on the real scanning line in a state in which the dot 622 in the 100% electrical potential level is set as the center.

[Phase Changing Processing]

Next, a description will be given of the phase changing processing that is performed in step S404 so as to correct bending of laser scanning lines. Bending of the laser scanning lines occurs due to non-uniformity of a lens in a deflection scanning apparatus, a deviation in a mounting position of the lens, a deviation in an installation position of the deflection scanning apparatus to a main body of the image processing apparatus, and the like. Bending occurs in the scanning lines due to the deviation in the positions. The image processing unit 208 performs processing of shifting the scanning lines toward a sub-scanning line direction at a predetermined position (changing position) in the main scanning direction so as to cancel bending of the scanning lines. Specifically, the image processing unit 208 performs processing of deviating the bitmap data toward the sub-scanning direction by one pixel at the predetermined position (changing position). When performing scanning by using the bitmap data in which bending is corrected, optical drawing in which bending is solved is realized. In a case when the bending correction is performed with respect to data with a low resolution, the amount of shift per one pixel is greater in comparison to a case when bending correction is performed with respect to data with high resolution, and thus, a step difference is likely to occur. Accordingly, in this embodiment, the bending correction is performed to bitmap data with a high resolution, such as the resolution of the controller.

FIGS. 7A to 7D are views illustrating a multi-value bitmap during phase changing and a filter that is used during phase changing. As described above, the phase changing processing is performed with respect to bitmap data with a resolution (1200 dpi) of the controller. FIG. 7A is a binary bitmap with a resolution of 1200 dip, which is subjected to the phase changing, and illustrates a line 701 having a three-pixel width. When phase changing is performed at a position in a horizontal coordinate 12 through the laser bending correction, a line bitmap, of which a phase deviates downwardly by one pixel, is obtained.

FIG. 7B illustrates a filter having a weighting coefficient in a size of 3×3 for conversion into a multi-value similar to FIG. 5B. FIG. 7C illustrates a multi-value bitmap obtained by performing conversion into a multi-value with respect to the bitmap after phase changing in FIG. 7A by using the filter in FIG. 7B. On the other hand, although a filter in another size may be used, it is preferable to use the filter in the size of 3×3 in consideration of the following reason. For example, in the case of a filter that does not have a size of (odd number)×(odd number), a deflection may occur in a pixel value after filtering. In addition, for example, in the case of using a filter in a size of 5×5, a pixel value becomes dimmer in comparison to the filter in the size of 3×3.

FIG. 7D illustrates a multi-value bitmap of which a resolution is converted into 600 dpi through resolution conversion processing with respect to the multi-value bitmap illustrated in FIG. 7C. In FIG. 7D, a phase of a line deviates by one dot between before the phase changing and after the phase changing, and thus, a line 711 before the phase changing is constituted by two dots having concentration values of 75% and 75%, and a line 712 after the phase changing is constituted by three dots having concentration values of 25%, 100%, and 25%. That is, a sampling period is two pixels in the vertical direction, and thus, sampling results in the vertical direction are neither equal nor inverted before and after a boundary of the phase changing.

The sums of line concentration values of the lines 711 and 712 are 75%+75%=150% (line 711) and 25%+100%+25%=150% (line 712), and are equal to each other. However, a dot in an intermediate electrical potential level, such as the concentration of 25% and the concentration of 75, is more unstable in comparison to a dot having a solid concentration of 100%. Accordingly, it cannot be said that the optical drawing thickness of the line 711 and the optical drawing thickness of the line 712 are completely equal to each other, and the thickness of the line 711 and the thickness of the line 712 may become different from each other. Particularly, in the case of optically drawing a thin line, such as a fine line, a difference in the thickness becomes significant.

According to this, in this embodiment, line width adjustment is performed through phase changing in order for the thickness of a line not to be changed.

[Line Width Adjustment Processing]

Figure 8:
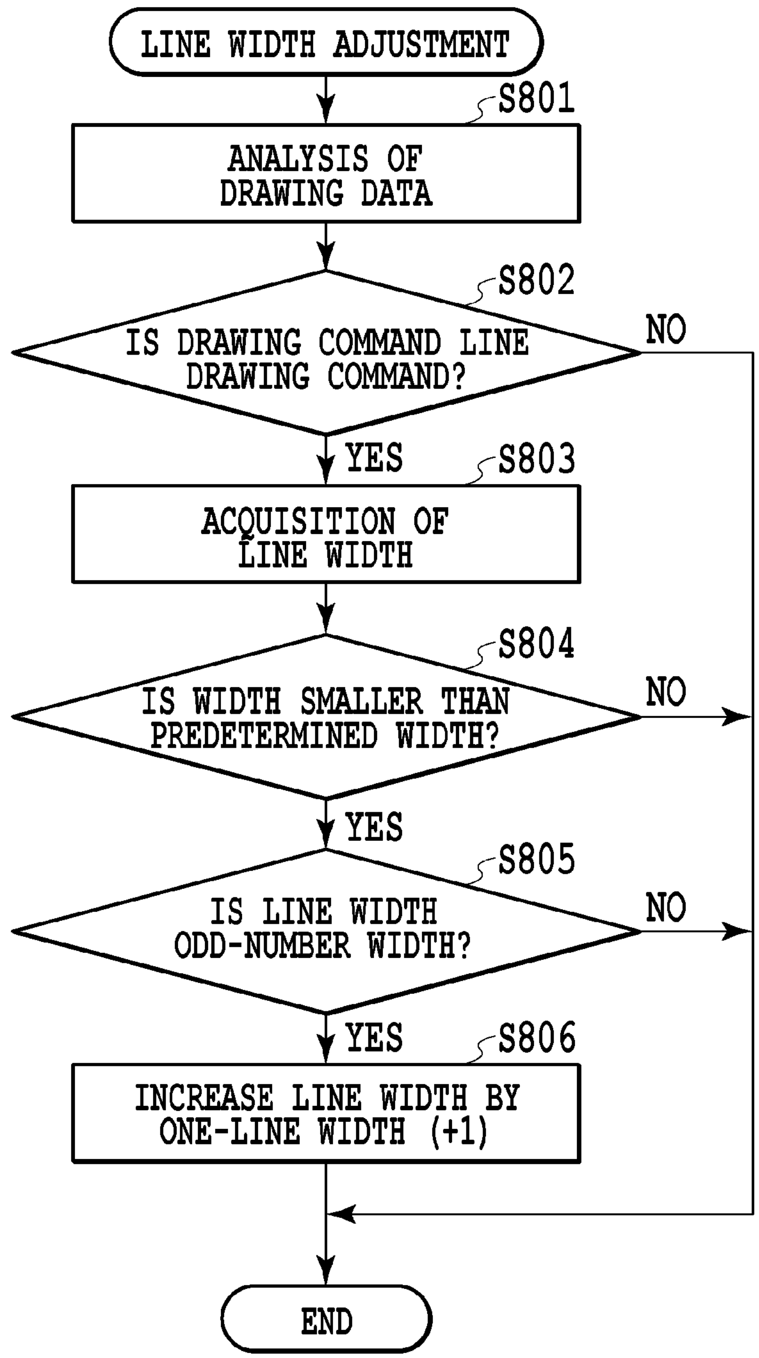
FIG. 8 is a flowchart illustrating a flow of line-width adjustment processing according to the first embodiment.

FIG. 8 is a flowchart illustrating a flow in line-width adjustment processing. The line-width adjustment processing is performed by a printer driver of the PC 10. That is, the line-width adjustment processing is performed in the printer driver before transmitting drawing data (PDL data) to the image processing apparatus.

In FIG. 8, the printer driver acquires drawing data in step S801, and sequentially analyzes a drawing command that is included in the drawing data. In step S802, the printer driver determines whether or not the drawing command is a line drawing command from the result of the analysis in step S801. In the case of the line drawing command, processing proceeds to step S803. Otherwise, the processing is terminated.

In the case of the line drawing command, in step S803, the printer driver acquires a line width defined by the drawing command. In step S804, the printer driver determines whether or not the line width is less than a predetermined width. Here, the predetermined width is a value for determination of a fine line, in which a difference in line thickness is likely to occur when a phase deviates, and, for example, an odd-number pixel width such as a three-pixel width and a five-pixel width is designated. On the other hand, the line width is a pixel width with the resolution of the controller. As described above, in addition to the drawing command, information indicating resolution is also included in the drawing data, and, in this embodiment, the resolution of the controller is designated.

In step S804, in a case when it is determined that the line width is less than the predetermined width, the processing proceeds to step S805. Otherwise, the processing is terminated. In step S805, the printer driver determines whether or not the line width is an odd-number width. The reason for making the determination is as follows. When performing resolution conversion with respect to a line bitmap (FIG. 5C), which is subjected to conversion into a multi-value by using the filter in the size of 3×3 shown in FIG. 5B, in the case of an odd-number line width, concentration values of dots, which constitute the lines (521 and 522), are different, depending on a phase. In a case when the line width is determined to be an odd-number width, the processing proceeds to step S806. Otherwise, the processing is terminated.

In step S806, the printer driver increases the line width by one-line width (+1) so as to set (correct) the line width to an even-number width, and terminates the processing. The above-described processing is performed with respect to the drawing command that is included in the drawing data. Furthermore, here, the printer driver performs the above-described processing by analyzing the drawing data, but the printer driver may perform the following processing. Specifically, during generation of the drawing data (drawing command), the printer driver analyzes a drawing command that is sequentially transmitted from an interface, such as a graphics interface device (GDI) provided to an operating system (OS) (not shown) of the PC 10, and specifies a line drawing command. In addition, with respect to the line drawing command that is transmitted from the GDI, the printer driver generates a PDL-type drawing command having a line width that is an even-number width. With respect to other drawing commands, the printer driver may generate a PDL-type drawing command in accordance with the drawing command transmitted from the GDI.

Drawing data (PDL data), which includes a drawing command of a line in which a line width is set to an even-number width, is transmitted to the image processing apparatus 11 through the network 15, as described above.

FIGS. 9A to 9D are views illustrating a multi-value bitmap during line width adjustment. FIG. 9A illustrates an example in which a line 902 and a line 903 are added to the binary bitmap of the three-pixel width line in FIG. 7A. That is, the line width is increased by a one-line width during the line width adjustment processing, and thus, the bitmap is set to an even-number width corresponding to four pixels. On the other hand, in this specification, “one line” is a line having a one-pixel width in accordance with the resolution of the controller. As is the case with the arrangement shown in FIG. 7A, when phase changing is performed at a coordinate 12 in the horizontal direction through the laser bending correction, a line bitmap, of which a phase deviates downwardly by one pixel, is obtained.

FIG. 9B illustrates a filter having a weighting coefficient in a size of 3×3 for conversion into a multi-value similar to FIG. 7B. FIG. 9C illustrates a multi-value bitmap obtained by performing conversion into a multi-value with respect to the bitmap illustrated in FIG. 9A by using the filter (FIG. 9B). In comparison to FIG. 7C, as the line width increases by one pixel, a line 911 having a concentration value of 100% increases.

FIG. 9D illustrates a multi-value bitmap of which a resolution is converted into 600 dpi by sampling the multi-value bitmap illustrated in FIG. 9C with a one-pixel interval through resolution conversion processing. In FIG. 9D, a phase of a line deviates by one dot between before the phase changing and after the phase changing, and thus, a line 921 before the phase changing is constituted by three dots having concentration values of 25%, 100%, and 75%, and a line 922 after the phase changing is constituted by three dots having concentration values of 75%, 100%, and 25%. That is, a sampling period is two pixels in the vertical direction, but the line width is corrected. Accordingly, a relationship, in which a sampling result in the vertical direction is inverted before and after a boundary of the phase changing, is maintained. A concentration value of a line is inverted in the vertical direction between before the phase changing and after the phase changing, but the line is constituted by a combination of dots having the same concentration value, and thus, the thickness of the line does not vary.

As described above, according to this embodiment, in a case when the line width of the line drawing command is an odd-number width, one line is added to the line width to obtain an even-number width. According to this, it is possible to draw a line having the same thickness, regardless of a phase.

On the other hand, in this embodiment, a description has been given of an example in which, when the line width of the line drawing command is an odd-number width, one line is added to the line width to obtain an even-number width. However, it is also possible to employ processing in which one line is deleted to obtain the even-number width. On the other hand, in a very short line width, when one line is deleted, a line may not be optically drawn. Therefore, in the case of deleting one line, it is possible to employ an aspect in which a lower threshold value is set, and one line is deleted when the line width is greater than the threshold value.

In addition, in this embodiment, a description has been given of an example in which the line-width adjustment processing is performed in the printer driver of the PC 10, but the line-width adjustment processing may be performed in the image processing apparatus 11. That is, it is possible to employ an aspect in which the processing illustrated in FIG. 8 is performed when generating intermediate data by analyzing the PDL data in the rendering unit 207 of the image processing apparatus 11. In addition, in this embodiment, with respect to a line command having a line width that is less than a predetermined width and is an odd-number width, the line width is set to be thickened by a one-pixel width in accordance with processing illustrated in FIG. 8. However, the following processing may be performed. That is, a line width, which is equal to or less than a predetermined width (for example, equal to or less than a three-pixel width), of a line command may be set (corrected) to a pixel width of the predetermined width+one pixel width (that is, a four-pixel width). In this case, it is possible to thicken a line having a width that is equal to or less than the predetermined width, and is an even-number width (two-pixel width), and it is possible to draw a line without being affected by a phase.

Second Embodiment

In the first embodiment, a description has been given of an example in which the line width of the line drawing command of the drawing data is adjusted, but the line may be drawn by using a drawing command of an image or a figure instead of the line drawing command. When drawing a line with a command other than the line drawing command, the line width is not set, and thus, it is difficult to adjust the line width by the method described in the first embodiment.

According to this, in the second embodiment, a description will be given of processing in which a line is detected from a binary bitmap with the processing resolution of the controller, and the line width is adjusted. On the other hand, as is the case with the first embodiment, this embodiment also illustrates processing of converting a binary bitmap of 1200 dpi that is the processing resolution of the controller into a multi-value bitmap of 600 dpi that is a printing resolution of the printer.

Figure 10:
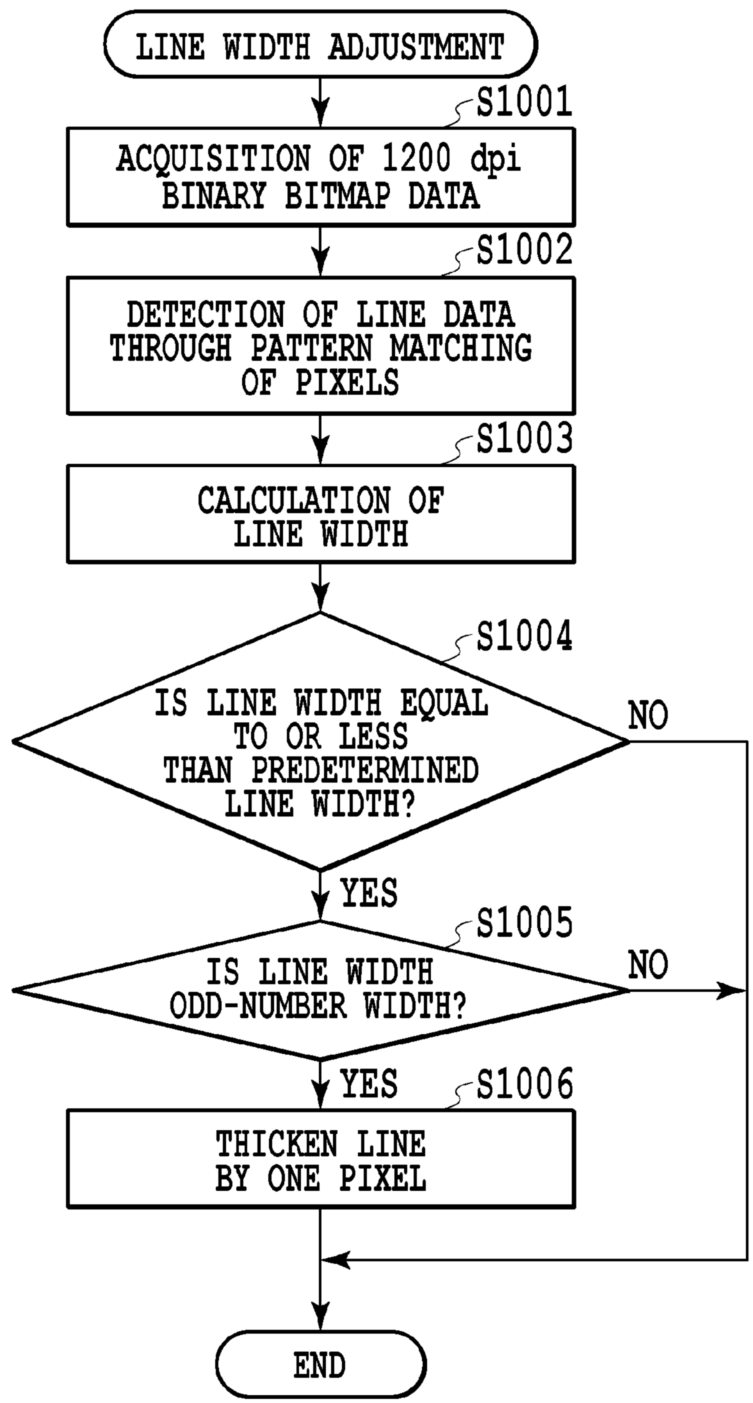
FIG. 10 is a flowchart illustrating a flow of line-width adjustment processing for a bitmap according to a second embodiment.

FIG. 10 is a flowchart illustrating a flow of the line-width adjustment processing for a bitmap. The line-width adjustment processing for the bitmap in this embodiment is performed with respect to binary bitmap data that is generated by the dither processing (S402) in the image processing unit 208.

First, in step S1001, the image processing unit 208 acquires binary bitmap data, which is generated in the dither processing in step S402, of 1200 dpi that is the processing resolution of the controller.

In step S1002, the image processing unit 208 performs pattern matching of respective pixels of bitmap data by using a detection window of N×M, and detects line data in the bitmap data. The detection window is set to a window having a size sufficient for detection of a fine line.

Next, in step S1003, the image processing unit 208 calculates a line width of the line data that is detected in step S1002.

In step S1004, the image processing unit 208 determines whether or not the line width is equal to or less than a predetermined width. As the predetermined width, for example, a three-pixel width, a five-pixel width, and the like, can be designated as described in the first embodiment. In a case when it is determined that the line width is equal to or less than the predetermined width, the processing proceeds to step S1005. Otherwise, the processing is terminated.

In step S1005, the image processing unit 208 determines whether or not the line width is an odd-number width. In a case when the line width is determined to be the odd-number width, the processing proceeds to step S1006. Otherwise, the processing is terminated.

In step S1006, the image processing unit 208 thickens line data by one pixel, and the processing is terminated.

Then, as described in the first embodiment, the image processing unit 208 performs the multi-value processing (S404) and the resolution conversion processing (S405) with respect to the line data that is thickened by one pixel.

Figure 11:
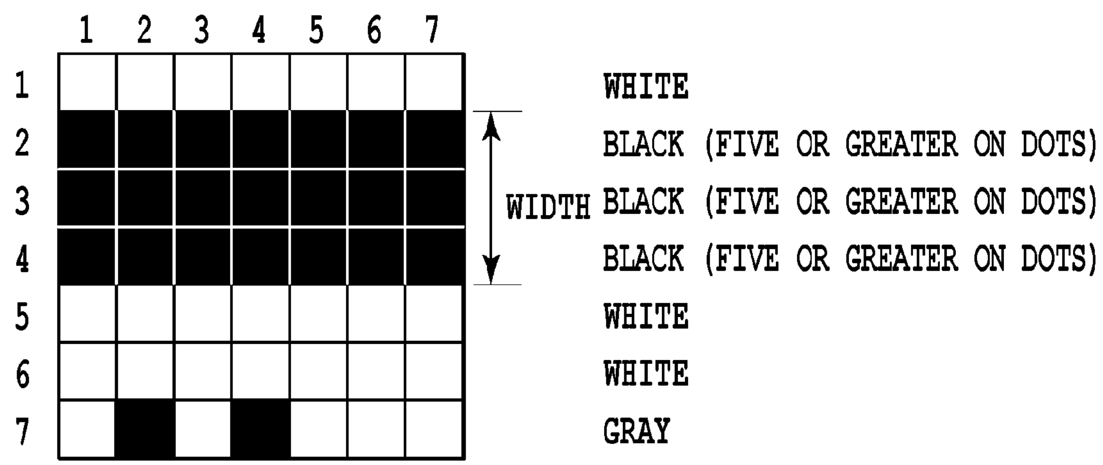
FIG. 11 is an explanatory view of line detection of binary bitmap data according to the second embodiment.

FIG. 11 is a view illustrating line detection of binary bitmap data. FIG. 11 is a view obtained by cutting a part of the binary bitmap data by using the detection window of N×M. FIG. 11 illustrates an example of using a window of 7×7. In the line detection, respective pixels in the window are processed in a row unit. For example, in a case when all of the dots in a row in the window are OFF dots, the row is determined to be white. In addition, in a case when the number of ON dots in a row in the window is five or greater, the row is determined to be black. The other cases are determined to be gray. In FIG. 11, a first row is white, and black continues from a second row. The unity of the rows in which black continues is determined to be a "line". In FIG. 11, the number of black rows that continue from the second row to a fourth row is determined to be a line width, to detect the line and the line width. In FIG. 11, a line having a line width of "3" is detected.

The multi-value processing and the resolution conversion processing have been described with reference to FIGS. 9A to 9D, and thus, a description thereof will be omitted in this embodiment.

As described above, according to this embodiment, a line is determined from a binary bitmap with the processing resolution of the controller, and the line width is adjusted. According to this, with respect to a line that is drawn with a drawing command other than the line drawing command, it is also possible to draw the line having the same thickness, regardless of a phase.

On the other hand, in this embodiment, a description has been given of the thickening processing as the line width adjustment, as an example, but thinning processing may be employed similar to the first embodiment.

In addition, even in this embodiment, the following processing may be performed. That is, a line width, which is equal to or less than a predetermined width (for example, equal to or less than a three-pixel width), of a line may be set (corrected) to a pixel width of the predetermined width+ one pixel width (that is, a four-pixel width). In this case, it is possible to thicken a line having a width that is equal to or less than the predetermined width, and is an even-number width (two-pixel width), and it is possible to draw a line without being affected by a phase.

Third Embodiment

In the first embodiment and the second embodiment, a description has been given of examples in which addition or deletion of one line is performed with respect to a line having an odd-number width, for adjustment into an even-number width.

When the line having an odd-number width is set to have an even-number width, it is possible to solve a problem in which the thickness of the line is apt to vary due to the phase changing, but the line width has the same thickness as that of an original line having the even-number width. For example, a line having a three-pixel width is adjusted to a line having a four-pixel width, and has the same thickness as that of the line having a four-pixel width. Therefore, the lines are not discriminated from each other.

According to this, in this embodiment, a description will be given of the following processing. Specifically, a line, which has a one-pixel width and a concentration of 50%, is added to a line having an odd-number width, and one line (a line having a one-pixel width) in the original line is thinned out by a concentration of 50%. According to this, a discrimination between the line having an odd-number width and the line having an even-number width is realized.

Figure 12:
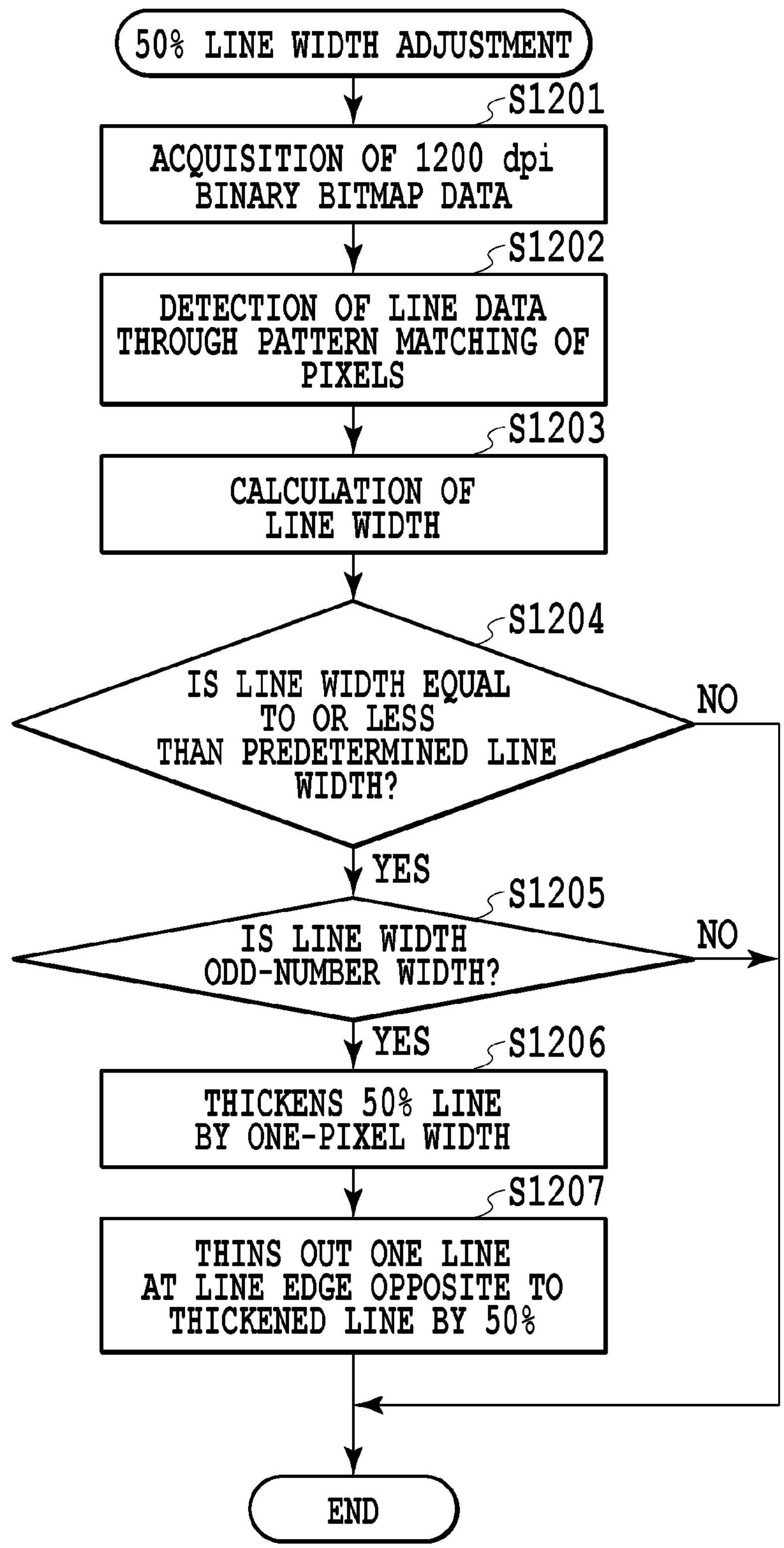
FIG. 12 is a flowchart illustrating a flow of 50% line-width adjustment processing for a bitmap according to a third embodiment.

FIG. 12 is a flowchart illustrating a flow of 50% line-width adjustment processing for a bitmap. The 50% line-width adjustment processing for the bitmap is performed in the image processing unit 208 with respect to binary bitmap data that is generated in the dither processing (S402).

On the other hand, processing from step S1201 to step S1205 may be set to be the same as the processing from step S1001 to step S1005 described in the second embodiment, and thus, a description thereof will be omitted.

After passing through step S1204 and step S1205, in a case when a line width is equal to or less than a predetermined width, and the line width is an odd-number width, the processing proceeds to step S1206.

In step S1206, the image processing unit 208 thickens 50% line data, which is thinned out with a one-pixel interval, by a one-pixel width. In addition, in step S1207, the image processing unit 208 thins out one line at a line edge thickened by a one-pixel width, and one line at a line edge that is opposite to the line edge is thinned out with a one-pixel interval to obtain 50% line data, and then, the processing is terminated.

Then, the multi-value processing (S404) and the resolution conversion processing (S405) are performed with respect to the line data that is subjected to the 50% line-width adjustment, as shown in FIG. 12.

FIGS. 13A to 13D are views illustrating a multi-value bitmap during 50% line-width adjustment and a filter that is used during the 50% line-width adjustment. FIG. 13A illustrates a bitmap obtained by adding 50% line data 1302 and 50% line data 1304, which are thinned out with a one-pixel interval during the 50% line-width adjustment processing, to the binary bitmap of a line having three-pixel width in FIG. 7A. In addition, the bitmap illustrated in FIG. 13A is a line bitmap in which one line at a line edge opposite to the added 50% line is thinned out with a one-pixel interval to obtain 50% line data 1303 and 50% line data 1305. As is the case with that shown in FIG. 7A, the phase changing is performed at a coordinate 12 in the horizontal direction though laser bending correction, and thus, a line bitmap, in which a phase deviates downwardly by one pixel, is obtained.

FIG. 13B illustrates a filter having a weighting coefficient in a size of 3×3 for conversion into a multi-value similar to that shown in FIG. 7B.

FIG. 13C illustrates a multi-value bitmap obtained by performing conversion into a multi-value with respect to the bitmap illustrated in FIG. 13A by using the filter (FIG. 13B). In comparison to that shown in FIG. 7C, the 50% line adjustment is performed, and thus, a line 1311 is constituted by pixels having concentration values 0%, 12%, 50%, 88%, 88%, 50%, 12%, and 0%.

FIG. 13D illustrates a multi-value bitmap of which a resolution is converted into 600 dpi by sampling the multi-value bitmap illustrated in FIG. 13C with a one-pixel interval through resolution conversion processing. In FIG. 13D, a phase of a line deviates by one dot between before the phase changing and after the phase changing, and thus, a line 1221 before the phase changing is constituted by three dots having concentration values of 12%, 88%, and 50%, and a line 1222 after the phase changing is constituted by three dots having concentration values of 50%, 88%, and 12%. A concentration value of a line is inverted in the vertical direction between before the phase changing and after the phase changing, but the line is constituted by a combination of dots having the same concentration value, and thus, the thickness of the line does not vary. The sum of concentration values of dots that constitute a line becomes 12%+88%+50%=150%, and thus, it is possible to discriminate the thickness from the sum of concentration values, that is, 25%+100%+75%=200% in dots which constitute the line that is simply thickened to a four-dot line as illustrated in FIG. 9D.

As described above, according to this embodiment, a line having a one-pixel width and a concentration of 50% is added to a line having an odd-number width, and a line having a one-pixel width in an original line is thinned out by a concentration of 50%. According to this, it is possible to draw a line having the same thickness regardless of a phase, and it is possible to discriminate a line having an odd-number width and a line having an even-number width from each other.

On the other hand, in this embodiment, a description has been given of an example in which 50% line data, which is thinned out with a one-pixel interval, is added, and one line at a line edge that is opposite to the added 50% line is thinned out with a one-pixel interval. However, there is no limitation to the example, and it is possible to employ any processing, as long as a combination of pixel values (concentration values), in which a resolution is converted through multi-value processing is the same between before the correction and after the correction (including vertical inversion). For example, it is also possible to employ processing in which 50% line data, in which two pixels are thinned out with a two-pixel interval, is added, and one line at a line edge opposite to the added 50% line is thinned out by two pixels with a two-pixel interval. In addition, with regard to the line that is thinned out, it is possible to employ an aspect in which a line located over an edge by one pixel is thinned out instead of the line that becomes an edge. The reason for employment of the processing or aspect is because a combination of pixel values (concentration values), in which a resolution is converted by multi-value processing through the 3×3 filter processing, is the same between before the correction and after the correction (including vertical inversion).

In addition, in this embodiment, a description has been given of an aspect in which a line is detected from bitmap data, but it is also possible to employ an aspect in which a drawing command is changed as described in the first embodiment. For example, in a case when a drawing width of the drawing command indicates a three-pixel width, for example, a line having a concentration of 50% is added to an upper portion in a drawing region of the drawing command. In addition, it is also possible to employ an aspect, in which a line width of the drawing command is changed to a two-pixel width, and one line having a concentration of 50% is added to lower portion of a drawing region in a line after the changing.

Other Examples

In the respective embodiments, a description has been given of a configuration in which processing of deviating the bitmap data by one pixel in the sub-scanning direction is performed through the phase changing processing, and thus, combinations of relative positions in pixel sampling with respect to a line do not match before correction of the line width. However, an application range of the invention is not limited to a case when the phase changing processing is performed. That is, the invention is applicable to the entirety of cases in which the combinations of the relative positions in the pixel sampling with respect to a line do not match when the line-width is not adjusted. For example, a line, which has an odd-number width and deviates in a sub-scanning direction for each pixel in a unit of several pixels, may be corrected to a line having an even-number width, and pixel sampling, in which a sampling period is set to two pixels (even-number pixel), may be performed with respect to the line after the correction. The above-described conversion into a multi-value may be performed between the correction of the line width and the pixel sampling.

Other Embodiments

Embodiment(s) of the present invention can also be realized by a computer of a system or an apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

According to the invention, when optically drawing a line by using the spot-multiplexing technology, it is possible to draw a line having the same thickness regardless of a drawing phase.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing system that performs correction of shifting bitmap data in a sub-scanning direction so as to cancel bending of an electro-photographic laser scanning line, the system comprising:

(A) a memory storing instructions; and (B) one or more processors that execute the instructions and cause an image processing apparatus to function as:

(a) a line command conversion unit that converts a first line drawing command defining a line width as an even-number pixel width less than a predetermined even-number pixel width into a second line drawing command defining a line width as the predetermined even-number pixel width, and converts a third line drawing command defining a line width as an odd-number pixel width less than the predetermined even-number pixel width into the second line drawing command defining a line width as the predetermined even-number pixel width;

(b) a generation unit that generates binary bitmap data with first resolution on a basis of drawing data including the second line drawing command;

(c) a correction unit that performs the correction with respect to the binary bitmap data that is generated;

(d) a resolution conversion unit that converts the binary bitmap data, which is corrected, into multi-value bitmap data with second resolution lower than the first resolution; and (e) an output unit that outputs the multi-value bitmap data, which is converted, to a printing unit.

2. The image processing system according to claim 1, wherein the line command conversion unit converts the third line drawing command defining a line width as an odd-number pixel width smaller than the predetermined even-number pixel width and greater than the line width defined by the first line drawing command, into the second line drawing command defining a line width as the predetermined even-number pixel width.

3. The image processing system according to claim 2, wherein the line command conversion unit converts a fifth line drawing command defining a line width as an odd-number pixel width smaller than the line width defined by the first line drawing command, into a sixth line drawing command defining a line width as the predetermined even-number pixel width.

4. The image processing system according to claim 1, wherein the line command conversion unit converts each line drawing command defining a line width smaller than the predetermined even-number pixel width into a line drawing command defining a line width as the predetermined even-number pixel width.

5. The image processing system according to claim 1, wherein the resolution conversion unit converts the binary bitmap data, which is corrected, into multi-value bitmap data, and converts resolution of the multi-value bitmap data that is converted.

6. The image processing system according to claim 5, wherein the resolution conversion unit converts the binary bitmap data, which is corrected, into the multi-value bitmap data by using a filter capable of setting a pixel value of a target pixel to an intermediate level concentration with reference to pixels values of peripheral pixels.

7. The image processing system according to claim 6, wherein the conversion unit uses a 3×3 filter, in which a coefficient at a central position is set to be higher than a coefficient at the other positions, as the filter.

8. An image processing method of performing correction of shifting bitmap data in a sub-scanning direction so as to cancel bending of an electro-photographic laser scanning line, the method comprising:

converting a first line drawing command defining a line width as an even-number pixel width smaller than a predetermined even-number pixel width into a second line drawing command defining a line width as the predetermined even-number pixel width;

converting a third line drawing command defining a line width as an odd-number pixel width smaller than the predetermined even-number pixel width into the second line drawing command defining a line width as the predetermined even-number pixel width;

generating binary bitmap data with first resolution on a basis of drawing data including the second line drawing command;

performing the correction with respect to the binary bitmap data that is generated;

converting the binary bitmap data, which is corrected, into multi-value bitmap data with second resolution lower than the first resolution; and outputting the multi-value bitmap data, which is converted, to a printing unit.

9. The image processing method according to claim 8, further comprising converting a third line drawing command defining a line width as an odd-number pixel width smaller than the predetermined even-number pixel width and greater than the line width defined by the first line drawing command, into the second line drawing command defining a line width as the predetermined even-number pixel width.

10. The image processing method according to claim 9, further comprising converting a fifth line drawing command defining a line width as an odd-number pixel width smaller than the line width defined by the first line drawing command, into a sixth line drawing command defining a line width as the predetermined even-number pixel width, wherein the sixth line drawing command is included in the drawing data.

11. The image processing method according to claim 8, wherein the conversion of the first line command is performed in conversion step of converting each line drawing command defining a line width smaller than the predetermined even-number pixel width into a line drawing command defining a line width as the predetermined even-number pixel width.

12. The image processing method according to claim 8, wherein the converting of resolution converts the binary bitmap data, which is corrected, into multi-value bitmap data, and converts resolution of the multi-value bitmap data that is converted.

13. The image processing method according to claim 12, wherein the conversion of resolution converts the binary bitmap data, which is corrected, into the multi-value bitmap data by using a filter capable of setting a pixel value of a target pixel to an intermediate level concentration with reference to pixels values of peripheral pixels.

14. The image processing method according to claim 13, wherein, in the conversion of resolution, further comprising using a 3×3 filter, in which a coefficient at a central position is set to be higher than a coefficient at the other positions, as the filter.

* * * * *